United States Patent
Ishii et al.

(10) Patent No.: US 11,415,750 B2
(45) Date of Patent: Aug. 16, 2022

(54) OPTICAL MODULE, OPTICAL WIRING BOARD, AND PRODUCTION METHOD FOR OPTICAL MODULE

(71) Applicant: Nippon Telegraph and Telephone Corporation, Tokyo (JP)

(72) Inventors: Hiroyuki Ishii, Musashino (JP); Yuta Ueda, Musashino (JP); Koji Takeda, Musashino (JP); Takushi Kazama, Musashino (JP); Hitoshi Wakita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/050,211

(22) PCT Filed: Mar. 25, 2019

(86) PCT No.: PCT/JP2019/012312
§ 371 (c)(1),
(2) Date: Oct. 23, 2020

(87) PCT Pub. No.: WO2019/208053
PCT Pub. Date: Oct. 31, 2019

(65) Prior Publication Data
US 2021/0239908 A1    Aug. 5, 2021

(30) Foreign Application Priority Data
Apr. 25, 2018 (JP) .............................. JP2018-084468

(51) Int. Cl.
*G02B 6/30* (2006.01)
*G02B 6/122* (2006.01)
(Continued)

(52) U.S. Cl.
CPC ............... *G02B 6/30* (2013.01); *G02B 6/122* (2013.01); *G02B 6/425* (2013.01); *H04B 10/40* (2013.01)

(58) Field of Classification Search
CPC .. G02B 6/4246; G02B 6/4257; G02B 6/4249; G02B 6/425; G02B 6/30; G02B 6/4214; G02B 6/122; G02F 1/025; H04B 10/40
(Continued)

(56) References Cited

U.S. PATENT DOCUMENTS 4,732,446 A * 3/1988 Gipson ................ G02B 6/2817
                                                     361/679.4
9,195,016 B2 * 11/2015 Suzuki ................. G02B 6/4292
(Continued)

FOREIGN PATENT DOCUMENTS

JP    2006-522943 A    10/2006
JP    2012-133324 A    7/2012

OTHER PUBLICATIONS

International Search Report dated Apr. 23, 2019, issued in PCT Application No. PCT/JP2019/012312, filed Mar. 25, 2019.
(Continued)

*Primary Examiner* — Michael P Mooney
(74) *Attorney, Agent, or Firm* — Workman Nydegger

(57) ABSTRACT

To provide an optical module, an optical wiring board, and a method for manufacturing an optical module that provide the two-dimensional freedom degree of the joint portion between the optical module and the optical fiber even through the OBO method is applied to an optical module mounted via WLP. The optical module includes a board, a plurality of optical input-output portions that change a travel direction of light traveling substantially orthogonally to the board to a direction substantially parallel to the board and change a travel direction of the light traveling substantially
(Continued)

parallel to the board to a direction substantially orthogonal to the board, one or more optical waveguides that optically connect the optical input-output portions to each other, and a lid that is attached to the board so as to include the optical input-output portions and the one or more optical waveguides, in which the lid has one or more reflection mirrors that change a travel direction of the light traveling from an outside of a side surface of the lid to an inside of the side surface so as to be directed to the optical input-output portions and change a travel direction of the light output from the optical input-output portions so as to be directed from the inside of the side surface of the lid to the outside of the side surface.

7 Claims, 7 Drawing Sheets

(51) Int. Cl.
*G02B 6/42* (2006.01)
*H04B 10/40* (2013.01)

(58) Field of Classification Search
USPC .......................................... 385/14, 49, 51, 92
See application file for complete search history.

(56) References Cited

U.S. PATENT DOCUMENTS

| | | | |
|---|---|---|---|
| 9,772,458 B1 | 9/2017 | Kim | |
| 2004/0202418 A1* | 10/2004 | Ghiron | G02B 6/425 385/36 |
| 2006/0215963 A1* | 9/2006 | Hamano | G02B 6/3897 385/49 |
| 2014/0023315 A1 | 1/2014 | Takai et al. | |

OTHER PUBLICATIONS

Takanori Suzuki et al., *Cost-Effective Optical Sub-Assembly Using Lens-Integrated Surface-Emitting Laser*, Journal of Lightwave Technology, vol. 34, No. 2, Jan. 15, 2016, pp. 358-364.

* cited by examiner

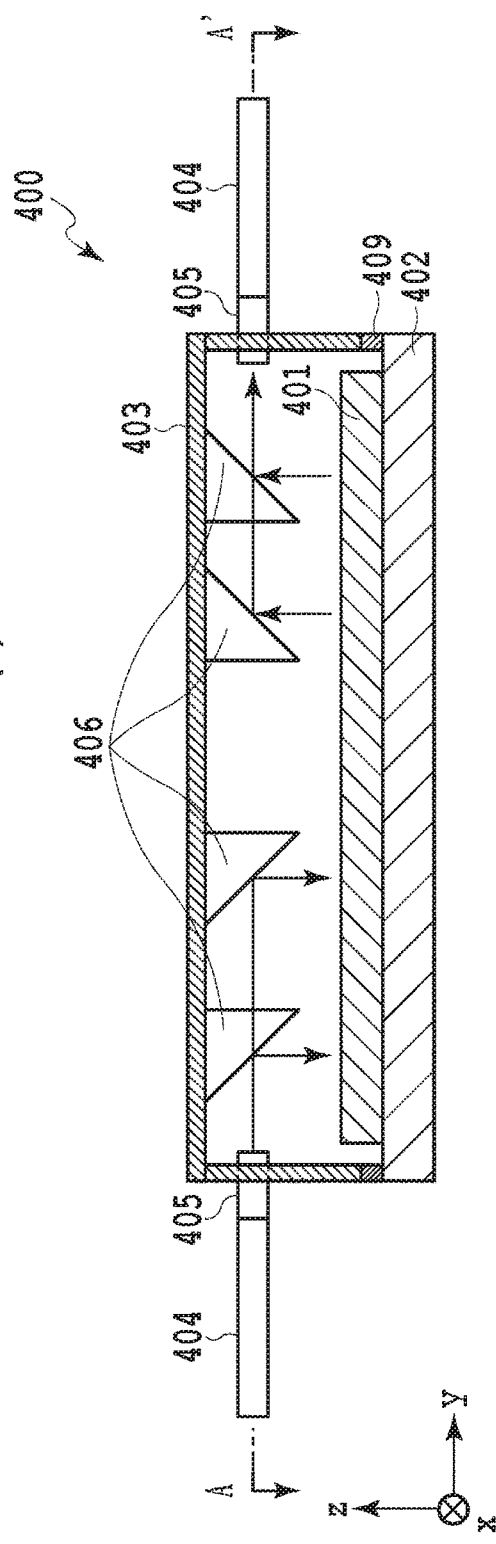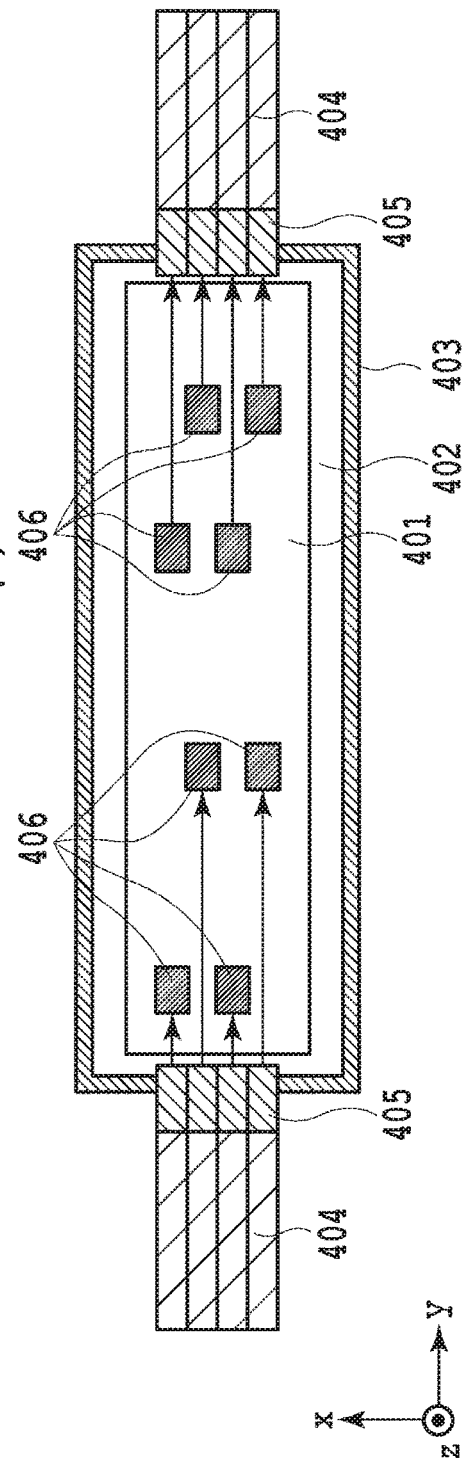

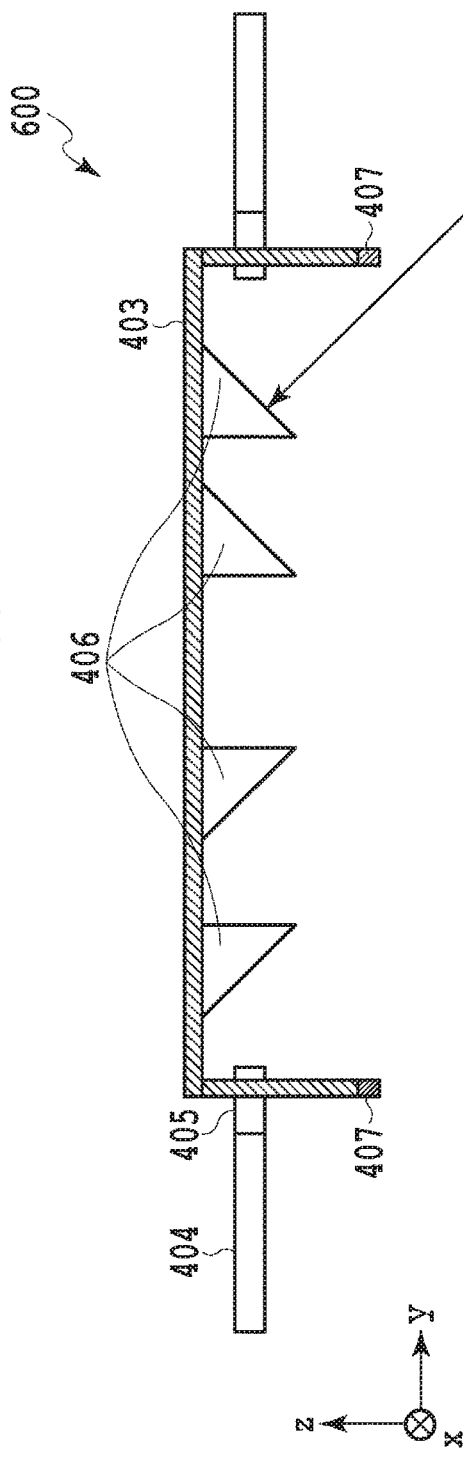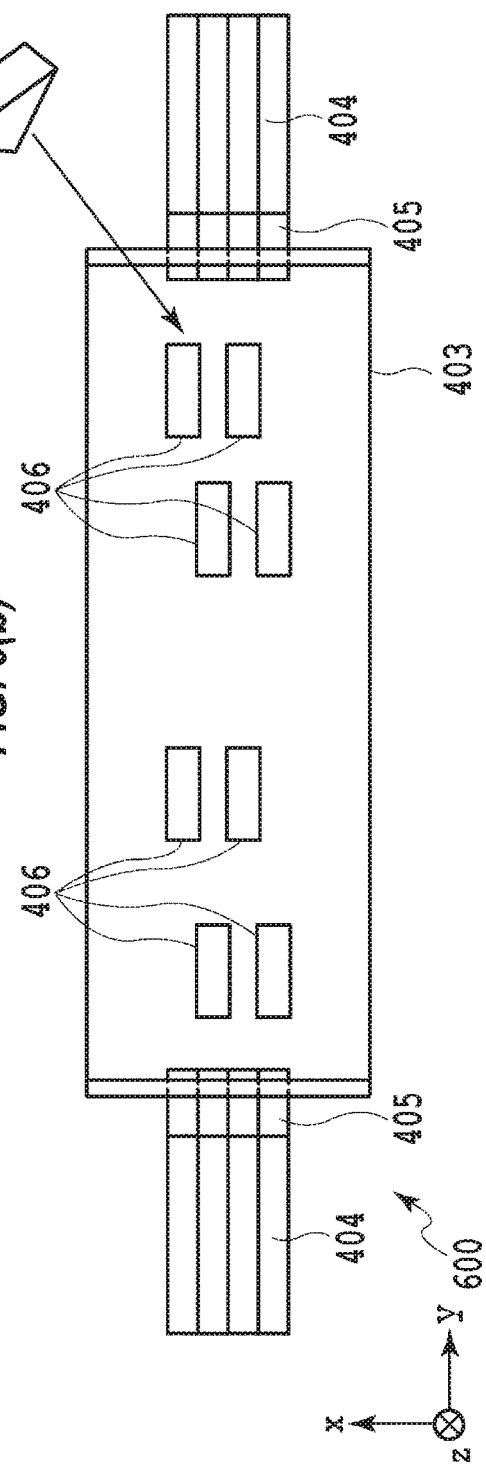

OPTICAL MODULE, OPTICAL WIRING BOARD, AND PRODUCTION METHOD FOR OPTICAL MODULE

TECHNICAL FIELD

The present invention relates to the mounting structure and the mounting method for an optical module and, more particularly, to the optical wiring structure of an optical module in on-board optics.

BACKGROUND ART

Generally, a group of components (light source, modulator, optical receiver, or electric circuits concerning these components) constituting an optical transceiver used for optical communication is integrated, mounted, and packaged in a standardized form factor typified by the CFP (Centum gigabit Form factor Pluggable) standard or the like.

FIG. 1 illustrates the structure (FIG. 1(a)) of a conventional optical transceiver 100 and the structure (FIG. 1(b)) of a communication device 110 on which the optical transceiver is mounted. The advantage of this mounting method is that the communication device 110 has high maintainability.

For example, as illustrated in FIG. 1(b), the communication device 110 has, as the front end portion thereof, a plurality of optical transceivers 100 in which a group of optical components is packaged therein. In the case of occurrence of failure or deterioration of components constituting the optical transceiver 100, for example, occurrence of a line break of a transmission optical fiber 101 or a reception optical fiber 102, damage of an element in an optical receiver 104, or degradation of an electronic circuit structural component of a control circuit 106, it is possible to maintain the normal operation of the communication device 110 by removing only the optical transceiver 110 including the components having failed or deteriorated from the main body of the communication device 110 and mount a normal optical transceiver instead.

On the other hand, a mounting method (referred to below as an OBO method) via On-Board Optics (referred to below as OBO) is known as a method (other than above) for mounting an optical module in a communication device. This OBO method differs from the method in FIG. 1 in which, when an optical transceiver is configured, a group of structural components is packaged in advance to configure an optical module and then the optical module is mounted in the communication device. In the OBO method, a group of components constituting an optical module is directly mounted on the printed wiring board.

FIG. 2 shows an example of the structure of a communication device 200 in which the communication device 110 having the optical transceivers in FIG. 1 (b) is configured by the OBO method. In the communication device 200, optical transceivers packaged in advance are not mounted as integrated modules, but groups of components including a modulator 213, an optical receiver 214, a light source 215, and a control circuit 216 are mounted on amounting board 210, and these achieve the functions of optical transceivers.

The first advantage of the OBO method is that the cost can be reduced to configure a communication device due to reduction in the mounting cost associated with reduction in the number of components because a plurality of optical modules do not need to be packaged individually.

In addition, since the optical transceivers in the communication device 200 are not packaged optical modules as illustrated in FIG. 2, the optical modules are not detached from or attached to the communication device 200. Accordingly, it is not necessary to one-dimensionally mount a group of components (modulator 213, optical receiver 214, light source 215, and control circuit 216) constituting each of the optical transceivers by arranging the group of components at one end of the mounting board 210 in the communication device 200. That is, the group of components including 213, 214, 215, and 216 constituting each of the optical transceivers can be two-dimensionally disposed at any position on the mounting board 210.

The second advantage of the OBO method is that the communication device 200 can be small-sized because the mount density of a groups of components constituting an optical module on the mounting board 210 can be improved due to two-dimensional disposition described above, and the power consumption of the communication device 200 can be reduced because the efficiency of the heat management of the communication device 200 can be improved by adjusting the disposition on the mounting board 210 of the groups of components constituting the optical module.

There are three technical requirements concerning this OBO method. The first technical requirement is that the components of the group should have substantially planar mountable portions such as BGA (ball grid array) for planar surface mounting of the group of components constituting the optical module on the mounting board in the communication device, and the components of the group should resist heat in the reflow process, that is, have a so-called reflowable heat resistance.

The second technical requirement is that self-alignment effects in the reflow process should function at high accuracy to suppress the deviation of the mounting positions of the group of components.

In addition, the third technical requirement is that the optical coupling between the optical module and the mounting board should be achieved at low cost as in the electrical coupling between the optical module and the mounting board easily achieved by a mounting method using BGA or the like.

The mounting method via wafer level packaging (referred to below as WLP) is applied to meet the three requirements concerning the OBO method. The mounting method via WLP does not mount a group of components on a semiconductor chip cut out from a semiconductor wafer, but mounts a group of components on a semiconductor wafer and then cuts out the mounted portion as a semiconductor chip.

For example, a semiconductor chip on which an optical module is mounted can be obtained by disposing and mounting a group of components constituting an optical module on a semiconductor wafer as appropriate and then properly cutting out each optical module from the semiconductor wafer.

FIG. 3 shows an example of the mounting structure in which an optical module 300 by the OBO method manufactured by a mounting method via WLP is mounted on a mounting board 301.

The optical module 300 includes an optical control circuit 333 and a Si optical circuit 330. The Si optical circuit 330 is obtained by forming the optical control circuit 333 including a modulator and the like on a semiconductor wafer using a Si (silicon) semiconductor and then cutting out the Si optical circuit 330 as a semiconductor chip. This optical module 300 needs to be electrically connected to the mounting board 301.

Two electric circuits 1 and 2 (312) sealed by a resin sealing material 310 are mounted on the mounting board 301 by a BGA package having solder bumps or solder balls 302 and electrically connected to the mounting board 301.

A laser diode 320 that performs photoelectric conversion is electrically connected to the electric circuits 1 and 2 (312) via electric wiring that penetrates through the resin sealing material 310.

The optical module 300 is adhered onto the resin sealing material 310 via an adhesive 303 so that laser light 321 emitted from the laser diode 320 can be input to the optical control circuit 333.

An optical fiber 331 is used to output an optical signal from the optical module 300. The optical fiber 331 is fixed by an optical fiber fixing structure 332 sandwiched between the resin sealing material 310 and the Si optical circuit 330 and optically connected to the Si optical circuit 330.

CITATION LIST

Non Patent Literature

NPL 1 Takanori Suzuki, Koichiro Adachi, Aki Takei, Kohichi R. Tamura, Akira Nakanishi, Kazuhiko Naoe, Tsukuru Ohtoshi, Kouji Nakahara, Shigehsa Tanaka, and Kazuhisa Uomi, "Cost-Effective Optical Sub-Assembly Using Lens-Integrated Surface-Emitting Laser", J. Ligtw. Technol., vol. 34 No. 2, p. 358 (2016)

SUMMARY OF THE INVENTION

Technical Problem

The mounting method for the optical module via WLP illustrated in FIG. 3 has the structure in which the optical module 300 is optically connected to the optical fiber 331 by fixing the optical fiber 331 using the end surface of the Si optical circuit 330 included in the optical module 300. Accordingly, the number of the optical fibers 331 that can be connected to one optical module 300 (that is, one semiconductor chip) is restricted by the size of the optical module 300.

In addition, since the connection portion between the optical module 300 and the optical fiber 331 is limited to the end surface of the Si optical circuit 330, one-dimensional disposition is needed when a plurality of optical fiber 331 are connected to the optical module 300. This reduces the freedom degree of disposition of the group of components constituting the optical module, which is the advantage of the OBO method.

Accordingly, the mounting method by the conventional WLP cannot meet the technical requirements of the OBO method while achieving the advantages of the OBO method.

In recent years, the mount structure in which the input-output portion of an optical signal of an optical module is disposed orthogonally to the extension direction of the mounting board has been reported.

For example, NPL 1 discloses the structure in which the laser light propagating through a horizontal waveguide in a semiconductor chip included in a surface-emitting laser is reflected in the vertical direction by a redirection mirror installed in the semiconductor laser chip and then incident on an optical fiber installed orthogonal to the direction of the waveguide in the semiconductor chip (NPL 1).

Means for Solving the Problem

The inventors of the application have achieved the present invention by applying the structure of the semiconductor chip disclosed in NPL 1, adding a lid internally having reflection mirrors to the structure, and obtaining an original idea of the structure of an optical module having an optical fiber array, provided on any side of the lid, that optically connects the inside and the outside of the lid.

The present invention solves the above problems. Specifically, there is provided an optical module, an optical wiring board, and a method for manufacturing an optical module that provide the two-dimensional freedom degree of the joint portion between the optical module and the optical fiber even through the OBO method is applied to an optical module mounted via WLP.

An optical module according to an embodiment of the present invention includes a board; a plurality of optical input-output portions that change a travel direction of light traveling substantially orthogonally to the board to a direction substantially parallel to the board and change a travel direction of the light traveling substantially parallel to the board to a direction substantially orthogonal to the board; one or more optical waveguides that optically connect the optical input-output portions to each other; and a lid that is attached to the board so as to contain the optical input-output portions and the one or more optical waveguides.

This lid has one or more reflection mirrors that change a travel direction of the light traveling from an outside of a side surface of the lid to an inside of the side surface so as to be directed to the optical input-output portions and change a travel direction of the light output from the optical input-output portions so as to be directed from the inside of the side surface of the lid to the outside of the side surface.

A method for manufacturing an optical module according to an embodiment of the present invention includes a first process that mounts, on a board, a plurality of optical input-output portions that cause light to be input to or output from the board substantially vertically and one or more optical waveguides that optically connect the optical input-output portions to each other; a second process that follows the first process and attaches a lid having one or more reflection mirrors to the board so that the one or more reflection mirrors are disposed vertically above the optical input-output portions and the optical input-output portions and the one or more optical waveguides are contained; and a third process that follows the second and cuts out parts of the board so as to contain at least one lid and obtains one of the cut parts of the board as the optical module.

Effects of the Invention

As described above, according to the present invention, it is possible to make the most of the high freedom degree of disposition of the optical module on the mounting board, which is the advantage of the OBO method.

BRIEF DESCRIPTION OF DRAWINGS

FIG. 4 is a schematic structural diagram illustrating an optical module 400 having a lid with reflection mirrors, wherein (a) is a side cross-sectional view thereof and (b) is a plan view thereof illustrating cross section A-A' in FIG. 4(a).

FIG. 6 is a schematic view illustrating a lid 600 with reflection mirrors, wherein (a) is a side cross-sectional view thereof and (b) is a bottom view thereof.

DESCRIPTION OF EMBODIMENTS

Embodiment 1

Figure 1A:
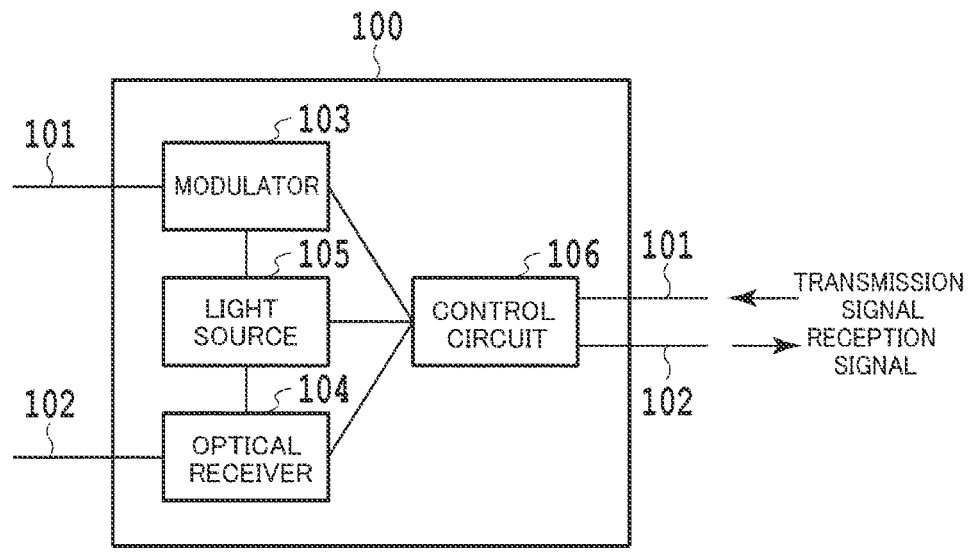
FIG. 1 is a schematic view illustrating the structure of a conventional optical transceiver and the structure of a communication device in which the optical transceiver is mounted, wherein (a) illustrates the structure of the optical transceiver and (b) illustrates the structure of the communication device in which the optical transceivers packaged in advance are mounted as modules.
Figure 1B:
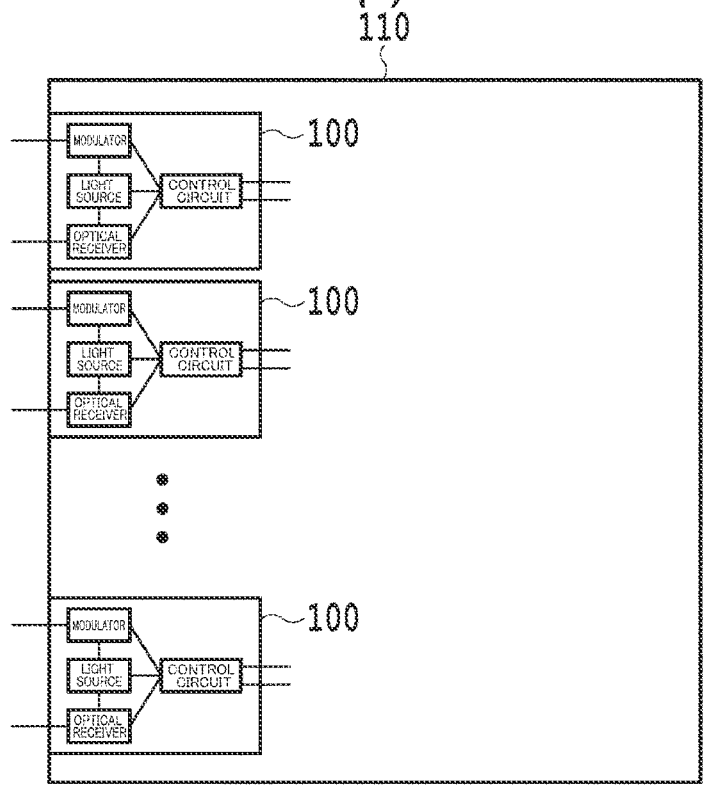
Figure 2:
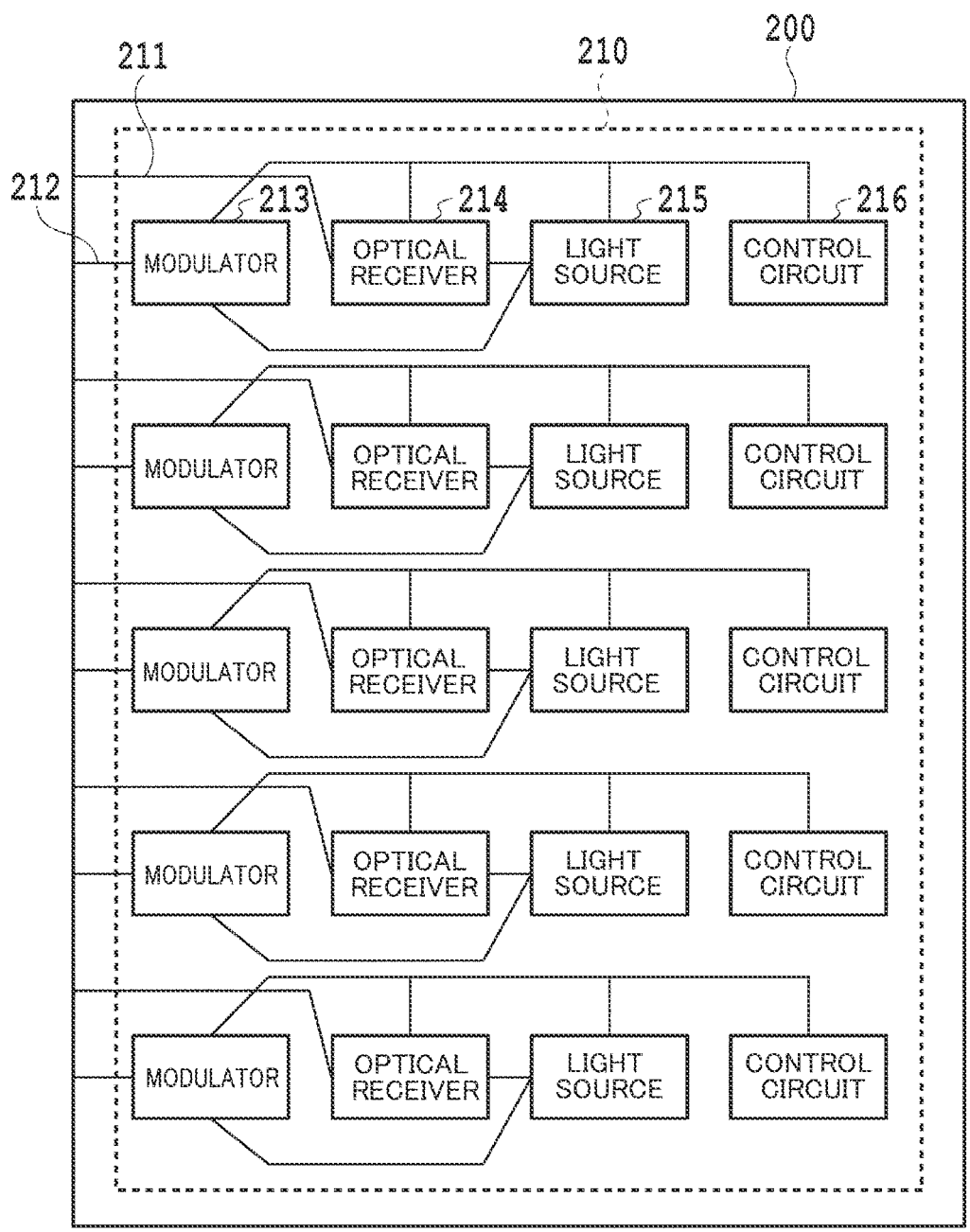
FIG. 2 is a schematic view illustrating the structure of the communication device in which the optical transceivers by an OBO method are mounted.
Figure 3:
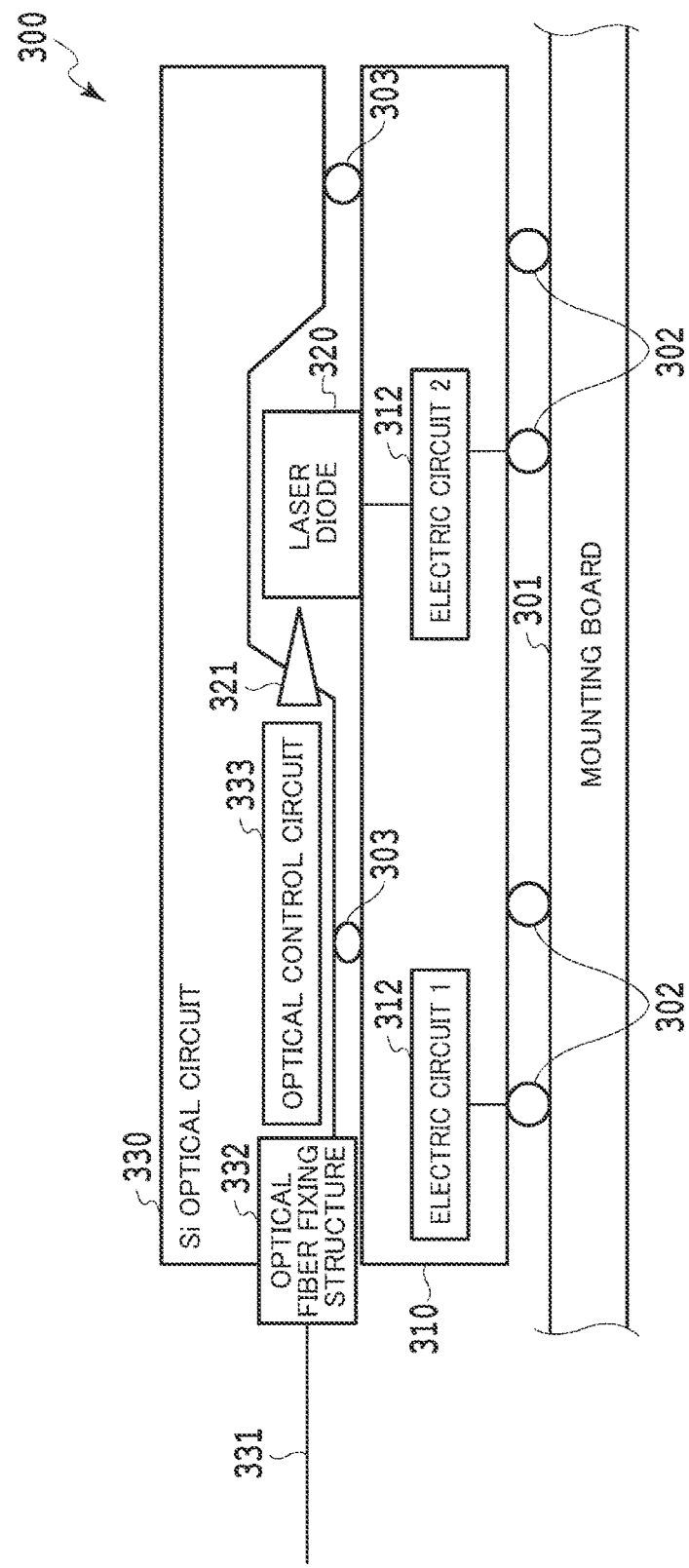
FIG. 3 is a schematic view illustrating the mounting structure in which an optical module manufactured by a mounting method via WLP is mounted on a mounting board by the OBO method.

An optical module will be described as a first embodiment of the present invention. FIG. 4 is a diagram illustrating the structure of an optical module 400 having a lid with reflection mirrors. FIG. 4(a) is a side cross-sectional view thereof and FIG. 4 (b) is a plan view thereof illustrating cross section A-A' in FIG. 4(a).

In the embodiment, a waveguide optical switch having four input ports and four output ports as an optical module is illustrated. A group of components constituting the waveguide optical switch is mounted on a semiconductor chip 401 and the components of the group are electrically or optically connected to each other. This waveguide type optical switch can arbitrarily set a combination of the input ports and the output ports by controlling current flowing through a micro heater (not illustrated in FIG. 4) formed in the semiconductor chip 401. It should be noted here that a group of components constituting the waveguide optical switch is not illustrated in FIG. 4.

The semiconductor chip 401 is mounted on a chip carrier 402 and the semiconductor chip 401 and the chip carrier 402 are electrically connected to each other. A lid 403 is attached so as to completely cover the semiconductor chip 401 and the chip carrier 402. Reflection mirrors 406 are disposed in upper portions on the inner surface of the lid 403. In the embodiment, a total of eight reflection mirrors 4 are disposed so as to correspond to the four inputs and the four outputs, respectively.

The reflection mirrors 406 may be formed of the same material as the lid 403 integrally with the lid 403 or may be disposed in upper portions on the inner surface of the lid 403 separately created by adhering. In addition, reflection surfaces can be formed on the inclined surfaces of the reflection mirrors 406 by known thin film forming means such as a vapor deposition method using metal such as gold.

The lid 403 is adhered to the semiconductor chip 401 or the chip carrier 402 via an adhesive portion 409 so as to completely cover the semiconductor chip 401 and the chip carrier 402. In this adhering method, the lid 403 is adhered to the semiconductor chip 401 or the chip carrier 402 by providing an adhesive metal A 407 for the lid 403 and an adhesive metal B 408 for the semiconductor chip 401 or the chip carrier 402, press-fitting the adhesive metal A 407 and the adhesive metal B 408 to each other, and heat-treating the press-fitted portion.

The adhesive metal A 407 is provided on the end surface of the open portion of the lower surface of the lid 403 and the adhesive metal B 408 is provided for either the semiconductor chip 401 or the chip carrier 402. The adhesive metal B 408 is preferably provided for the semiconductor chip 401 when the optical module 400 having the lid with reflection mirrors is mounted by WLP. When the adhesive metal B 408 is provided for the semiconductor chip 401, the adhesive metal B 408 is provided along the outer periphery inside the outer periphery of the surface of the semiconductor chip 401 on which the group of components constituting the optical module of the semiconductor chip 401 is mounted (the case in which the adhesive metal B 408 is provided on the semiconductor chip 401 will be described below).

The adhesive metal A 407 and the adhesive metal B 408 are preferably created by the vapor deposition method. In addition, the adhesive metal A 407 and the adhesive metal B 408 are preferably made of gold (Au) and preferably formed like bumps.

In addition, the semiconductor chip 401 is adhered to the lid 403, the temperature of heat treatment applied to the joint portion thereof is preferably equal to or less than the temperature at which the group of components constituting the optical module is mounted on the semiconductor chip 401. That is, the temperature of heat treatment is preferably is equal to or less than the temperature at which the optical module is mounted on the semiconductor chip 401. By regulating this temperature, the strength of a mechanical joint and the stability of an electric joint between the group of components constituting the optical module and the semiconductor chip 401 can be ensured and the operation stability of the optical module can be ensured eventually.

In the embodiment, when, for example, InP (indium phosphide) is adopted as the material of the semiconductor chip 401, the temperature of heat treatment to adhere the semiconductor chip 401 to the lid 403 is preferably 300° C. or less. When the temperature of heat treatment is further lowered, an ultrasonic adhering method is also applicable. When this ultrasonic adhering method is applied, the upper limit of the temperature of heat treatment for adhering can be reduced to 150° C. from 300° C. Specifically, application of local ultrasonic vibrations and pressure to the joint portion 409 instantaneously melts the adhesive metal A 407 provided on the lid 403 and the adhesive metal B 408 provided on the semiconductor chip 401, forms the joint portion 409, thereby enabling joint.

The light input from the outside of the optical module 400 having the lid with reflection mirrors is guided through an optical fiber array 404 and input to the inside of the lid 403. When the light is input to the inside of the lid 403, the light is made parallel by a collimating lens array 405 connected to the end of the optical fiber array 404 and output to the inside of the lid 403.

The light having been output to the inside of the lid 403 travels straight in the Y-axis direction in FIG. 4, is reflected by the reflection mirror 406, changed in the light path to the Z-axis direction in FIG. 4 and travels straight as is, and incident on the optical input-output portions (not illustrated in FIG. 4 and indicated by reference numeral 501 in FIG. 5 described later) mounted on the semiconductor chip 401.

The light having been incident on the optical input-output portion propagates through the inside of waveguides 401a disposed on the surface of or inside the semiconductor chip 401 and is output orthogonally (that is, in the Z-axis direction in FIG. 4) to the semiconductor chip 401 from an optical input-output portion that differs from the optical input-output portion on which the light has been incident. The output light is reflected by the reflection mirror 406 again, changed in the light path to the Y-axis direction in FIG. 4 and travels straight as is, incident on the optical fiber array 404 provided as an output port, and output to the outside of the optical module 400 having the lid with reflection mirrors. When the light is output to the outside of the optical module 400 having the lid with reflection mirrors, in contradiction to the case in which the light is input to the inside of the optical module 400 having the lid with reflection mirrors, the light is first made parallel via the collimating lens array 405 and then incident on the optical fiber array 404.

The embodiment is an optical waveguide switch having four input ports and four output ports as an example of the optical module. According to the present invention, the optical module is not limited to the waveguide optical switch and application to any optical module is enabled. For example, by increasing and reducing the number of optical fibers of the optical fiber array 404 that is an input-output port or changing the disposition of the reflection mirrors 406 formed on the upper surface inside the lid 403, application to an optical module having any number of input-output ports or having optical input-output portions disposed in any positions is enabled.

Embodiment 2

Figure 5A:
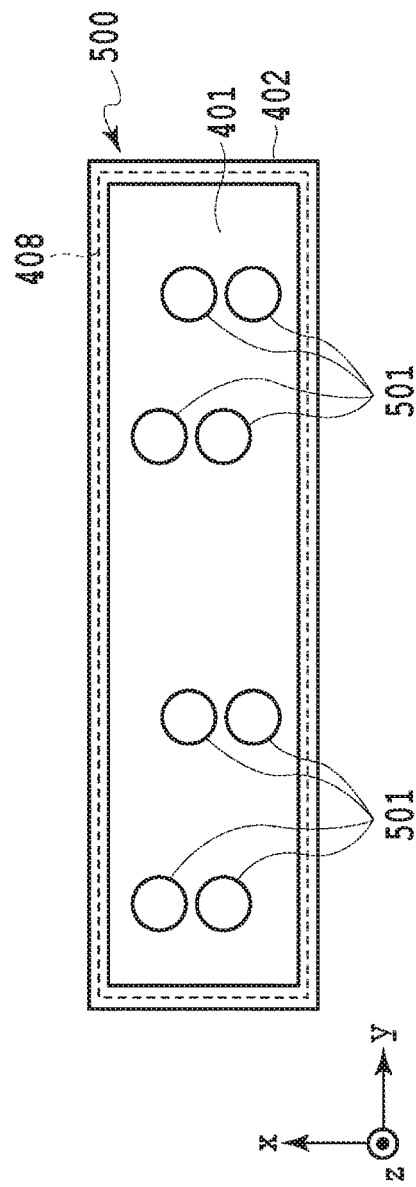
FIG. 5 is a diagram illustrating a method for manufacturing the optical module, wherein (a) is a plan view illustrating a semiconductor chip 401 (optical module set 500) mounted on a chip carrier 402 and (b) is a side cross-sectional view when the optical module set 500 is mounted on a printed wiring board 502.
Figure 5B:
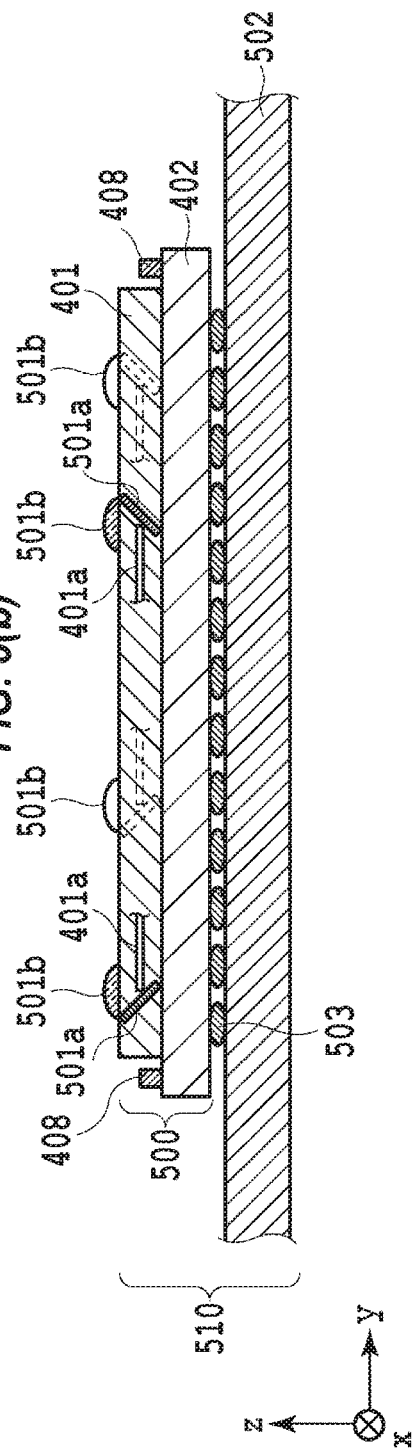

FIG. 5 is a diagram illustrating a method for manufacturing the optical module according to the present invention. FIG. 5(a) is a plan view illustrating the semiconductor chip 401 (referred to below as the optical module set 500) mounted on the chip carrier 402 and FIG. 5(b) is a side cross-sectional view when the optical module set 500 is mounted on a printed circuit board (referred to below as a PCB) 502.

First, the optical module set 500 is formed by mounting the mounted semiconductor chip 401 on the chip carrier 402. This optical module set 500 is mounted on the PCB 502.

The semiconductor chip 401 is provided with the optical input-output portions 501 capable of inputting and outputting light orthogonally to the surface of the semiconductor chip 401. The optical input-output portion 501 according to the embodiment includes a light redirection portion 501a that changes the travel direction of light between the Y-axis direction and the Z-axis direction in FIG. 5 and a lens 501b that gathers the light changed in the travel direction by the light redirection portion. In addition, the plurality of optical input-output portions provided on the semiconductor chip 401 are optically connected to each other via the waveguides 401a provided on the surface of or inside the semiconductor chip 401. The disposition and the structures of the light redirection portion, the lens, and the waveguides that forms the optical input-output portion 501 according to the embodiment are the same as in NPL 1.

The optical module set 500 is mounted on the PCB 502 by a solder reflow process. Reference numeral 510 represents the state in which the optical module set 500 is mounted on the PCB 502. Electrical connection between the semiconductor chip 401 and the PCB 502 is made via electric wiring (not illustrated in FIG. 5) provided on the upper surface of the chip carrier and solder bumps or solder balls 503 provided on the bottom surface of the chip carrier 402.

FIG. 6 illustrates a lid 600 with reflection mirrors used to cover the optical module set 500. FIG. 6(a) is a side cross-sectional view thereof and FIG. 6(b) is a bottom view thereof.

First, the optical fiber array 404, the collimating lens array 405, and the reflection mirrors 406 are connected to or formed on the lid 403 to form the lid 600 with reflection mirrors. The reflection mirrors 406 (reference numeral 601 is a perspective view illustrating 406) are formed in upper portions on the inner surface of the lid 600 with reflection mirrors so as to be located vertically above the optical input-output portions 501 provided on the semiconductor chip 401. In addition, the collimating lens array 405 connected to the end of the optical fiber array 404 is connected to the side wall of the lid 600 with reflection mirrors so that the light reflected by the reflection mirrors 406 can be received and the light having propagated through the inside of the optical fiber array 404 can be reflected by the reflection mirrors.

At this time, the collimating lens array 405 can be inserted into and connected to grooves (dash line portions in FIG. 6) provided in the side walls of the lid 600 with reflection mirrors so that the collimating lens arrays 405 penetrate through the side walls of the lid 600 with reflection mirrors and reach the inside thereof. In addition, even when no grooves are provided in the side walls of the lid 600 with reflection mirrors, the collimating lens arrays 405 can be connected to the side walls of the lid 600 with reflection mirrors without reaching the inside of the lid 600 with reflection mirrors by appropriately selecting the properties of the material of the lid 600 with reflection mirrors. At this time, the material of the lid 600 with reflection mirrors is preferably less likely to absorb the light with a frequency for optical communication and, for example, silicon can be adopted as the material.

Next, with respect to the optical module set 500 mounted on the PCB 502 via a solder reflow process, the lid 600 with reflection mirrors is mounted on the PCB 502 so that the lid 600 with reflection mirrors and the PCB 502 enclose the optical module set 500.

Since the lid 600 with reflection mirrors is disposed so that the reflection mirrors are located vertically above the optical input-output portions 501 in advance as described above, the optical input-output portion 501 provided on the semiconductor chip 401 can be connected simply and conveniently in a short time to the reflection mirrors 406, the collimating lens array 405, and the optical fiber array 404 provided on the lid 600 with reflection mirrors without adjusting alignment using a separately prepared laser diode.

In addition, the operation and effect of passive alignment can be applied to this optical joint. For example, when the lid 600 with reflection mirrors is joined to the PCB 502 via soldering, the self-alignment effect of solder joint can be used. In the case of mechanical joint, positioning via abutting or fitting between the lid 600 with reflection mirrors and the PCB 502 can be used.

Embodiment 3

In the embodiment, adoption of an optical modulator in which semiconductor amplifiers are integrated as the optical module will be described. The disposition relationship between the semiconductor chip 401, the chip carrier 402, the lid 600 with reflection mirrors is the same as in the optical module 400 having the lid with reflection mirrors illustrated in FIG. 4. In addition, the semiconductor chip 401 uses InP (indium phosphide) as the material thereof.

The embodiment differs from embodiment 1 in that the optical fiber array 404, which is an input-output port of the optical module 400 having the lid with reflection mirrors, further has an optical isolator 701 at the end thereof in addition to the collimating lens array 405.

Figure 7A:
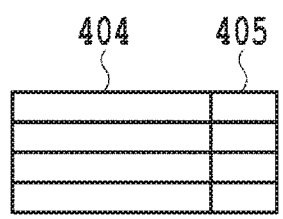
FIG. 7 is a schematic view illustrating an optical fiber array 404 having a collimating lens array 405 and the optical fiber array 404 further having an optical isolator 701, wherein (a) illustrates the optical fiber array 404 having the collimating lens array 405 at the end thereof.
FIG. 7(b) illustrates the optical fiber array 404 further having the optical isolator 701 at the end of the collimating lens array 405 and FIG. 7(c) illustrates the optical fiber array 404 having the optical isolator 701 for causing light to travel in the direction opposite to that in FIG. 7(b).
Figure 7B:
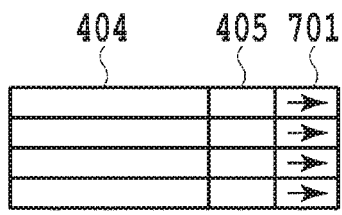
Figure 7C:
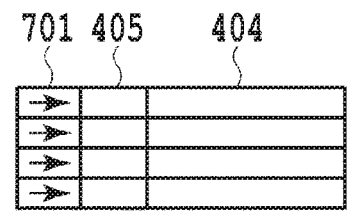

FIG. 7 is a diagram illustrating the optical fiber array 404 with the collimating lens array 405 and the optical fiber array 404 with the optical isolator 701. FIG. 7(a) illustrates the case in which the collimating lens array 405 is provided at the end of the optical fiber array 404, FIG. 7(b) illustrates the case in which the optical isolator 701 is further provided at the end of the collimating lens array 405, and FIG. 7(c) illustrates the case in which the optical isolator 701 for transmitting light in a direction opposite to that in FIG. 7(b).

When the optical module has an amplification function as the semiconductor amplifier adopted in the embodiment, the light fed back from the outside of the optical module 400 having the lid with reflection mirrors may induce oscillation phenomenon in the optical module and the operation of the optical module may become unstable. By using the optical fiber array 404 having the optical isolator 701 as an input-output port of the optical module 400 having the lid with reflection mirrors, this oscillation phenomenon can be suppressed efficiently.

Specifically, the optical fiber array 404 having the optical isolator 701 in FIG. 7(b) is disposed in the input port (on the left side in FIG. 4) of the optical module 400 having the lid with reflection mirrors in FIG. 4 and the optical fiber array 404 having the optical isolator 701 in FIG. 7(c) is disposed in the output port (on the right side in FIG. 4).

This structure allows the light fed back from the outside of the optical module 400 having the lid with reflection mirrors to pass only in the forward direction with respect to the feedback direction and interrupts the light in the opposite direction when the light is input to the inside of the lid 600 with reflection mirrors.

In embodiments 1 to 3 above, it is apparent that an optical circuit can be designed while ensuring the freedom degree of two-dimensional disposition which is the advantage of the OBO method without restrictions on the direction and the number of wires.

REFERENCE SIGNS LIST

100 Conventional optical transceiver
101, 211 Transmission optical fiber
102, 212 Reception optical fiber
103, 213 Modulator
104, 214 Optical receiver
105, 215 Light source
106, 216 Control circuit
110 Communication device having conventional optical transceiver
100
200 Communication device configured by OBO method
210 Mounting board
300 Optical module
301 Mounting board on which optical module 300 is mounted
302, 503 Solder bump or solder ball
303 Adhesive
310 Resin sealing material
312 Electric circuit 1 and electric circuit 2
320 Laser diode
321 Laser light emitted from laser diode 320
330 Si optical circuit
331 Optical fiber
332 Optical fiber fixing structure
333 Optical control circuit
400 Optical module having lid with reflection mirrors
401 Semiconductor chip
402 Chip carrier
403 Lid
404 Optical fiber array
405 Collimating lens array
406 Reflection mirror
407 Adhesive metal A
408 Adhesive metal B
409 Joint portion
500 Optical module set
501 Optical input-output portion
502 Printed wiring board
510 Optical wiring board on which optical module 500 is mounted
600 Lid with reflection mirrors
601 Perspective view illustrating reflection mirrors 406
701 Optical isolator

The invention claimed is:

1. An optical module that performs mutual conversion between an optical signal and an electric signal, the optical module comprising:
   a board;
   a plurality of optical input-output portions that change a travel direction of light traveling substantially orthogonally to the board to a direction substantially parallel to the board and change a travel direction of the light traveling substantially parallel to the board to a direction substantially orthogonal to the board;
   one or more optical waveguides that optically connect the optical input-output portions to each other; and
   a lid that is attached to the board so as to contain the optical input-output portions and the one or more optical waveguides, wherein the lid has one or more reflection mirrors that change a travel direction of the light traveling from an outside of a side surface of the lid to an inside of the side surface so as to be directed to the optical input-output portions and change a travel direction of the light output from the optical input-output portions so as to be directed from the inside of the side surface of the lid to the outside of the side surface,
   wherein the one or more reflection mirrors are disposed vertically above the input-output portions in a same location in a width direction of the optical module.

2. The optical module according to claim 1, wherein the optical input-output portions are disposed substantially in parallel to the board.

3. The optical module according to claim 1, further comprising:
   a first optical fiber array; and
   a second optical fiber array, wherein the first optical fiber array is disposed on a first side surface of the lid, an end surface of the first optical fiber array faces the reflection mirrors, the second optical fiber array is disposed on a second side surface of the lid, and an end surface of the second optical fiber array faces the reflection mirrors.

4. An optical wiring board electrically and/or optically connected to the optical module according to claim 3.

5. A method for manufacturing an optical module that performs mutual conversion between an optical signal and an electric signal, the method comprising:
- a first process that mounts, on a board, a plurality of optical input-output portions that cause light to be input to or output from the board substantially vertically and one or more optical waveguides that optically connect the optical input-output portions to each other;
- a second process that follows the first process and attaches a lid having one or more reflection mirrors to the board so that the one or more reflection mirrors are disposed vertically above the optical input-output portions and the optical input-output portions and the one or more optical waveguides are contained;
- a third process that follows the second and cuts out parts of the board so as to contain at least one lid and obtains one of the cut parts of the board as the optical module; and
- a fourth process that follows the third process and disposes a first optical fiber array on a first side surface of the lid so that an end surface of the first optical fiber array faces the one or more reflection mirrors and disposes a second optical fiber array on a second side surface of the lid so that an end surface of the second optical fiber array faces the one or more reflection mirrors.

6. The optical module according to claim 2, further comprising:
- a first optical fiber array; and
- a second optical fiber array, wherein the first optical fiber array is disposed on a first side surface of the lid, an end surface of the first optical fiber array faces the reflection mirrors, the second optical fiber array is disposed on a second side surface of the lid, and an end surface of the second optical fiber array faces the reflection mirrors.

7. An optical module that performs mutual conversion between an optical signal and an electric signal, the optical module comprising:
- a board;
- a plurality of optical input-output portions that change a travel direction of light traveling substantially orthogonally to the board to a direction substantially parallel to the board and change a travel direction of the light traveling substantially parallel to the board to a direction substantially orthogonal to the board;
- one or more optical waveguides that optically connect the optical input-output portions to each other;
- a lid that is attached to the board so as to contain the optical input-output portions and the one or more optical waveguides, wherein the lid has one or more reflection mirrors that change a travel direction of the light traveling from an outside of a side surface of the lid to an inside of the side surface so as to be directed to the optical input-output portions and change a travel direction of the light output from the optical input-output portions so as to be directed from the inside of the side surface of the lid to the outside of the side surface;
- a first optical fiber array; and
- a second optical fiber array,
- wherein the optical input-output portions are disposed substantially in parallel to the board, and the reflection mirrors are disposed vertically above the optical input-output portions, and
- wherein the first optical fiber array is disposed on a first side surface of the lid, an end surface of the first optical fiber array faces the reflection mirrors, the second optical fiber array is disposed on a second side surface of the lid, and an end surface of the second optical fiber array faces the reflection mirrors.

* * * * *